Jan. 29, 1957     T. T. SHORT     2,779,909

SPEED RESPONSIVE CIRCUIT

Filed Aug. 20, 1953

INVENTOR.
THOMAS T. SHORT
BY Maurice H. Kleitman
Wade Loomis AND
ATTORNEYS

United States Patent Office 2,779,909
Patented Jan. 29, 1957

2,779,909
SPEED RESPONSIVE CIRCUIT

Thomas T. Short, Emporia, Va., assignor to the United States of America as represented by the Secretary of the Air Force Application August 20, 1953, Serial No. 379,484

4 Claims. (Cl. 323—71)

This invention relates to speed responsive circuits and more particularly to a circuit for producing an electrical signal which is a predetermined nonlinear function of a speed of a machine.

In the art of speed responsive circuits, it is oftentimes desirable to provide a circuit which is capable of producing an electrical signal which is a nonlinear function of speed. However, those previously known circuits for accomplishing this, as a general rule, utilize a tachometer generator and the signal from the generator is modified by the use of conventional filter circuits. In practice it has been found to be extremely difficult, if not impossible, to design a filter circuit capable of producing a signal having the desired nonlinear function characteristic.

In the art of speed control apparatus for engines, for example, it is oftentimes desirable to provide a signal which is a nonlinear function of the speed of the engine and this nonlinear signal is used, either by itself or in combination with other signals, to modify the throttle signal so that under certain operating conditions of the engine the throttle control will be either ineffective or less effective in its operation of the fuel valve, whereby the engine will not be caused to stall by too large an increase in throttle setting.

In accordance with this invention, the output of the tachometer generator is modified by a plurality of parallel connected filters, each having a characteristic different than any of the others and although the output of all of the filters are connected in parallel to a common load, a blocking rectifier is provided in each output so that the voltage across the common load at any given frequence of the tachometer generator signal will be that of the filter circuit delivering the highest output voltage, independently of the voltage output of any of the other filter circuits.

It is a further object of this invention to provide a speed circuit which is particularly well suited for producing an output signal which may be any particular nonlinear function of speed. These and other objects will become more apparent when read in the light of the accompanying drawings and specification, however, reference being had to the appended claims for the degree of scope to be given this invention and wherein:

Figure 1:
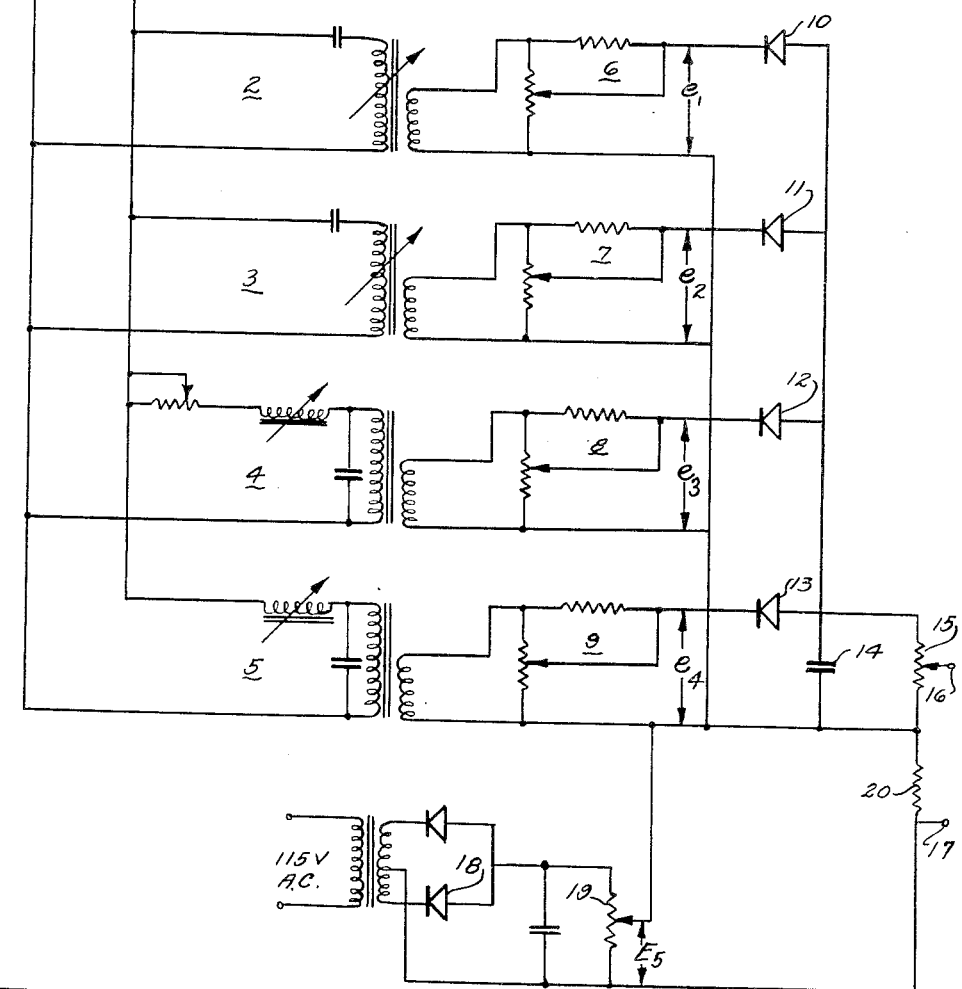
Fig. 1 is a simplified schematic diagram of a speed responsive circuit constructed in accordance with the principles of this invention.

Referring now to Figure 1, a tachometer generator 1, which which is driven in accordance with the speed of an object such as an engine, produces an output voltage whose frequency is proportional to the speed of the object. The output voltage of the tachometer generator is applied to the input of each of the filter circuits 2, 3, 4 and 5. It will be understood that the number of filter circuits required for any particular application of this invention will be dependent upon the degree of nonlinearity of the signal to be produced. The filter circuits 2, 3, 4 and 5 are each preferably provided with means for adjusting one or more of the circuit elements so that the center frequency and the bandwidth of the filter or the center frequency or the bandwidth of the filter may be readily changed. The filter circuits 2, 3, 4 and 5 are preferably provided with potentiometer circuits 6, 7, 8 and 9 respectively in their outputs so that the output level of those filters may be adjusted to the desired value.

The output of filter circuits 2, 3, 4 and 5 are connected through rectifiers 10, 11, 12 and 13 respectively in parallel to a common load circuit including capacitor 14 and potentiometer 15.

Figure 2:
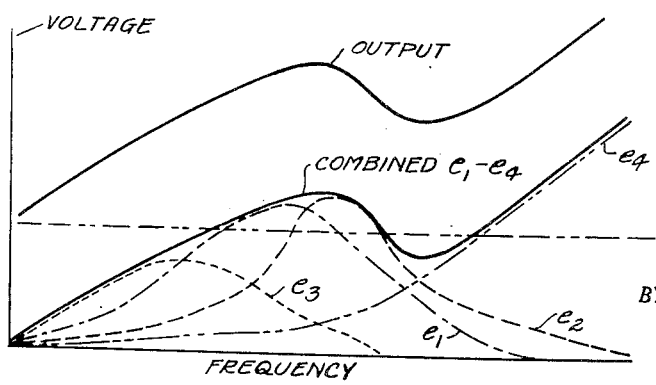
Fig. 2 is a family of curves illustrating the characteristic of each of the filter circuits of Figure 1 as well as the characteristic of the combined filters.

The output waveform characteristic of each of the filter circuits is shown in Figure 2. The points in the circuit of Figure 1 at which the voltage $e1$, $e2$, $e3$ and $e4$ are taken are marked in Figure 1 and the waveform of Figure 2 are correspondingly marked.

Since each of the filter circuits 2, 3, 4 and 5 of Figure 1 is connected through rectifiers, and is also connected in parallel to the common load circuit, the output of those combined filter circuits at any given frequency will be that of the filter circuit delivering the highest output voltage independently of the other filter circuits. Therefore, the voltage across the load circuit including capacitor 14 and potentiometer 15 for any given output frequency of the tachometer generator will be substantially that indicated by the curve of Figure 2 which is marked "combined $e1$–$e4$."

The output signal of Figure 1, which is taken across terminals 16 and 17, also includes an adjustable direct current component so that the absolute value of the output signal may be adjusted to any desired value. This is accomplished by rectifying a source of A. C. potential by a full wave rectifier 18, and by applying the output of the rectifier from the potentiometer 19 to the resistor 20 which is series connected to potentiometer 15 and capacitor 14.

The waveform characteristic of the output voltage across terminals 16 and 17 of Figure 1 is shown as the curve marked "output" in Figure 2.

Although the specific apparatus embodying this invention has been shown and described, it will be understood that such a showing has been made in order that the invention may be more completely understood, and is not to be considered in any way as limiting this invention. Many other types of apparatus may be used to carry out this invention as well as many modifications, additions and omissions from the particular apparatus shown and described.

What is claimed is:

1. A speed responsive circuit for producing an output signal the amplitude of which is a nonlinear function of speed comprising, a tachometer generator for producing an input signal having a frequency which is a function of speed, a plurality of filter circuits connected in parallel to the output of said generator, each filter having a frequency response characteristic different from that of any other of said filters, each of said filter circuits having a two terminal output, one output terminal of each filter being connected to one end of a common load impedance, a plurality of rectifiers, the other output terminal of each filter being connected through one of said rectifiers to the other end of said common load impedance, each of said rectifiers having the same polarity with respect to said load impedance whereby said rectifiers are equally biased by the voltage across said common load impedance so that at any given frequency of input signal all filter circuits except that having the greatest output at that frequency are decoupled from said common load impedance.

2. Apparatus as in claim 1 wherein said common load impedance is a capacitor and a potentiometer connected in parallel.

3. Apparatus as in claim 2 wherein the output of each of said filters is taken across an adjustable potentiometer.

4. Apparatus as in claim 1 and including a direct current power supply having a continuously adjustable output, a load impedance for said power supply, said power supply load impedance being connected in series with the common load impedance of said filters.

References Cited in the file of this patent

UNITED STATES PATENTS

| | | |
|---|---|---|
| 1,776,592 | MacDonald | Sept. 23, 1930 |
| 2,496,730 | Lindbeck et al. | Feb. 7, 1950 |
| 2,591,798 | Faure-Herman | Apr. 8, 1952 |
| 2,610,315 | McKendry | Sept. 9, 1952 |